United States Patent
Tanaka

(10) Patent No.: US 10,735,702 B2
(45) Date of Patent: Aug. 4, 2020

(54) PROJECTION DISPLAY APPARATUS AND LENS APPARATUS

(71) Applicant: CANON KABUSHIKI KAISHA, Tokyo (JP)

(72) Inventor: Junichi Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 15/991,496

(22) Filed: May 29, 2018

(65) Prior Publication Data

US 2018/0352203 A1 Dec. 6, 2018

(30) Foreign Application Priority Data

May 30, 2017 (JP) .................. 2017-106589

(51) Int. Cl.
| | | |
|---|---|---|
| *H04N 9/31* | (2006.01) | |
| *G03B 21/20* | (2006.01) | |
| *G02B 7/10* | (2006.01) | |
| *G02B 27/14* | (2006.01) | |
| *G02F 1/133* | (2006.01) | |
| *G02F 1/1335* | (2006.01) | |
| *G03B 21/00* | (2006.01) | |
| *G03B 21/14* | (2006.01) | |

(52) U.S. Cl.
CPC .......... *H04N 9/3105* (2013.01); *G02B 7/102* (2013.01); *G02B 27/141* (2013.01); *G02F 1/13306* (2013.01); *G02F 1/133526* (2013.01); *G03B 21/005* (2013.01); *G03B 21/142* (2013.01); *G03B 21/2066* (2013.01); *H04N 9/317* (2013.01); *H04N 9/3194* (2013.01); *G02F 2203/12* (2013.01); *G03B 2206/00* (2013.01)

(58) Field of Classification Search
CPC .... H04N 9/3105; H04N 9/3194; H04N 9/317; G02F 1/13306; G02F 1/133526; G02F 2203/12; G02B 27/141; G02B 7/102; G03B 21/2066; G03B 21/142; G03B 2206/00; G03B 21/005
See application file for complete search history.

(56) References Cited

U.S. PATENT DOCUMENTS 8,721,089 B2     5/2014   Hatakeyama et al.

FOREIGN PATENT DOCUMENTS

| JP | 2011010114 A | | 1/2011 |
|---|---|---|---|
| JP | 2012173699 A | | 9/2012 |
| JP | 2012177846 A | * | 9/2012 |
| JP | 2012177846 A | | 9/2012 |

(Continued)

OTHER PUBLICATIONS

Office Action issued in Japanese Appln. No. 2017-106589 dated Mar. 26, 2019. English translation provided.

*Primary Examiner* — Michelle M Iacoletti
*Assistant Examiner* — Danell L Owens
(74) *Attorney, Agent, or Firm* — Rossi, Kimms & McDowell LLP

(57) ABSTRACT

A projection display apparatus to which a lens apparatus includes a storage configured to store information about a reference panel pitch size is detachably attachable and an image generator configured to generate an image, and a controller configured to set a driving condition for the lens apparatus in accordance with a size of one pixel in the image generator and the reference panel pitch size.

14 Claims, 5 Drawing Sheets

(56) References Cited

FOREIGN PATENT DOCUMENTS

| JP | 2015206855 A | | 11/2015 |
|---|---|---|---|
| JP | 2016114667 A | * | 6/2016 |
| JP | 2016114667 A | | 6/2016 |
| JP | 2016131003 A | | 7/2016 |
| JP | 2017032650 A | | 2/2017 |

* cited by examiner

PROJECTION DISPLAY APPARATUS AND LENS APPARATUS

BACKGROUND OF THE INVENTION

Field of the Invention

The present invention relates to a projection (type) display apparatus to which a lens apparatus can be detachably attached, and the lens apparatus detachably attachable to the projection display apparatus.

Description of the Related Art

A plurality of projection display apparatuses can provide a so-called multi-projection for two-dimensionally arranging images so as to project one large image and a so-called stack projection for superimposing images on each other so as to project a high luminance image. In order to aligning images without significantly degrading the image quality, sizes and positions of the images may be aligned with one another by using a plurality of projection display apparatuses. One image-size equalizing adjustment (fine (micro) adjustment of the magnification) may be made, for example, by pressing a zooming button for a short time period in a remote controller. However, an excessively fine adjustment amount complicates the adjustment whereas an excessively rough adjustment amount is unsuitable for the adjustment. Therefore, a proper fine adjustment of the magnification is necessary.

Japanese Patent Laid-Open No. ("JP") 2015-206855 discloses a projection display apparatus that sets a driving voltage or a driving time in fine adjustment driving based on a driving time in driving in a predetermined range so as to always provide a constant fine adjustment amount despite different operating conditions caused by an installation orientation, an installation environment, and a component tolerance in manufacturing.

The projection display apparatus disclosed in JP 2015-206855 can cancel out the different operating conditions caused by the installation orientation, the installation environment, and the component tolerance in manufacturing, and can always provide the constant fine adjustment amount.

For example, when a fine adjustment amount is defined as an amount movable for each 0.5 pixel, a necessary fine adjustment amount fluctuates in accordance with one-pixel size (panel pitch size) in an image generator, such as a liquid crystal panel and a DMD. A projection lens may include an interchangeable lens attached to and detached from a body of a projection display apparatus. It is conceivable that one projection lens is detachably attachable to the body of plural types of projection display apparatuses having different pitch sizes. In this case, the projection display apparatus disclosed in JP 2015-206855 that does not utilize panel pitch size information in the projection display apparatus to calculate a fine adjustment amount for a magnification adjuster cannot change the fine adjustment amount.

SUMMARY OF THE INVENTION

The present invention provides a projection display apparatus and a lens apparatus, which can provide a proper fine adjustment when a panel pitch size in the projection display apparatus and a reference panel pitch size stored in the lens apparatus are different from each other.

A projection display apparatus according to the present invention to which a lens apparatus includes a storage configured to store information about a reference panel pitch size is detachably attachable and an image generator configured to generate an image, and a controller configured to set a driving condition for the lens apparatus in accordance with a size of one pixel in the image generator and the reference panel pitch size.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 5:
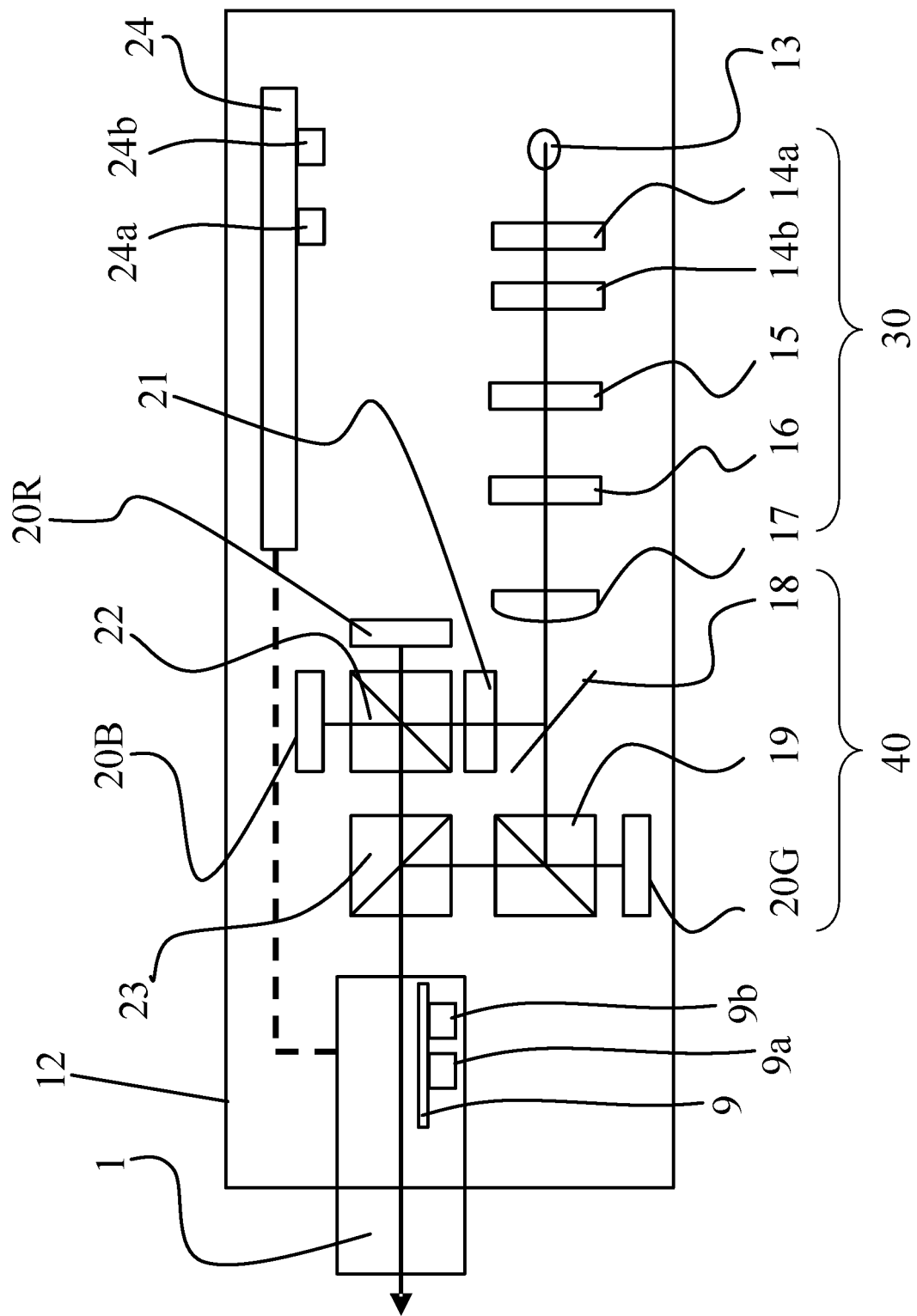
FIG. 5 is a block diagram of a projection display apparatus according to each embodiment.

Referring now to FIG. 5, a description will be given of a schematic structure of a projection display apparatus according to this embodiment. FIG. 5 is a block diagram of a projection display apparatus 12 according to this embodiment. A projection lens 1 is attached to and detached from the projection display apparatus 12. Light from a (solid) light source 13 enters an illumination optical system 30. The illumination optical system introduces uniform light onto liquid crystal panels (image generators) 20R, 20G, and 20B so as to generate an arbitrary image. The illumination optical system 30 in this embodiment includes fly-eye lenses 14a and 14b, a UV cut filter 15, a PS (polarization) conversion element 16, and a condenser lens 17.

The light from the light source 13 generates uniform light in the illumination planes on the liquid crystal panels 20R, 20G, and 20B, and is guided to the fly-eye lenses 14a and 14b. The light from the fly-eye lens 14b excludes light in the ultraviolet ("UV") region, and is led to the UV cut filter 15. The light from the UV cut filter 15 is guided to the PS conversion element 16 so as to align the polarization directions with one another. The light fluxes from the PS conversion element 16 is guided to the condenser lens 17 so as to align them with the illumination areas on the liquid crystal panels 20R, 20G, and 20B.

The light from the condenser lens 17 travels to a color separating/combining system 40. The color separating/combining system 40 separates the light from the light source 13 into three colored light fluxes of red (R), green (G), and blue (B) and combines these light fluxes with one another. The color separating/combining system 40 in this embodiment includes a dichroic mirror 18, a green prism 19, the liquid crystal panels 20R, 20G, and 20B, a color selector 21, a red/blue prism 22, and a combining prism 23.

The light from the condenser lens 17 is guided to the dichroic mirror 18. The dichroic mirror 18 transmits light in a green wavelength band and reflects light in other wavelength bands. The light that has transmitted through the dichroic mirror 18 is irradiated onto the liquid crystal panel 20G via a reflection surface in the green prism 19. An arbitrary image generated by the liquid crystal panel 20G transmits through the reflection surface on the green prism 19, and reaches the combining prism 23.

The light reflected on the dichroic mirror 18 is guided to a red/green prism 22 via the color selector 21 configured to convert the polarization direction of the light in the blue wavelength band. The light in the red wavelength band reflected on the reflection surface of the red/blue prism 22 is irradiated onto the liquid crystal panel 20R. An arbitrary image generated by the liquid crystal panel 20R transmits through the reflection surface on the red/blue prism 22, and reaches the combining prism 23. The light in the blue wavelength band that has transmitted through the reflection surface on the red/blue prism 22 is irradiated onto the liquid crystal panel 20B. The arbitrary image generated by the liquid crystal panel 20B is reflected on the reflection surface in the red/blue prism 22, and reaches the combining prism 23.

The red, blue, and green light fluxes reaching the combining prism 23 are projected onto an unillustrated screen plane (target plane) via the projection lens (lens apparatus) 1 detachably attachable to the projection display apparatus 12. A control substrate 24 includes a microcomputer (controller, setter) 24a, and a memory (storage) 24b, and controls operations in the projection display apparatus 12. The control substrate 24 is electrically connected to a lens control board (lens controller) 9 provided in the projection lens 1, and controls the projection lens 1 in cooperation with the lens control board 9. The lens control board 9 includes a lens microcomputer (controller) 9a, and a memory (storage) 9b.

Figure 2:
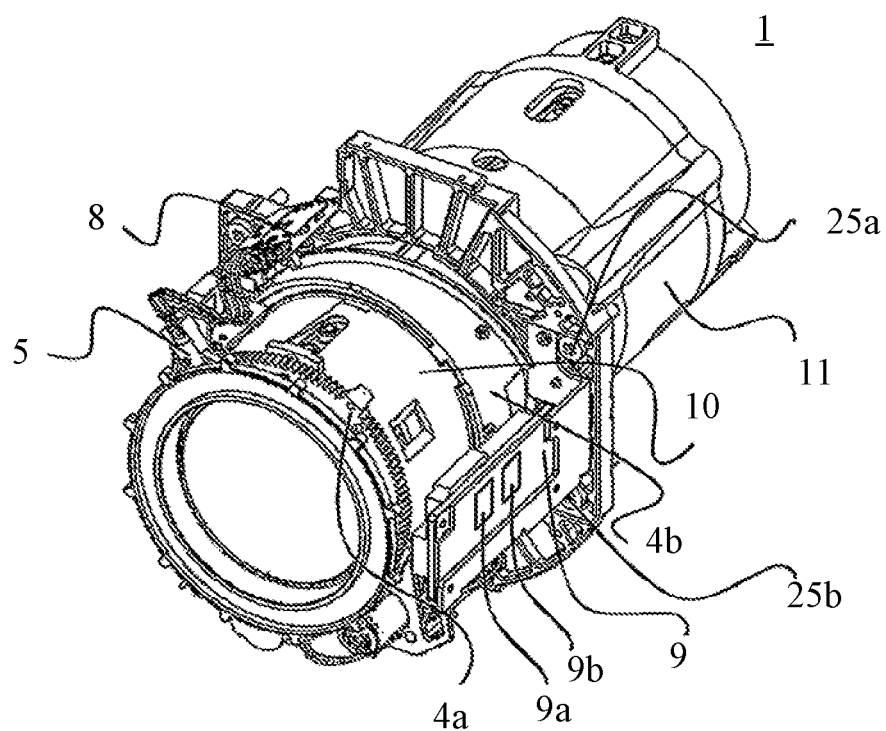
FIG. 2 is a perspective view of a projection lens according to each embodiment.
Figure 3:
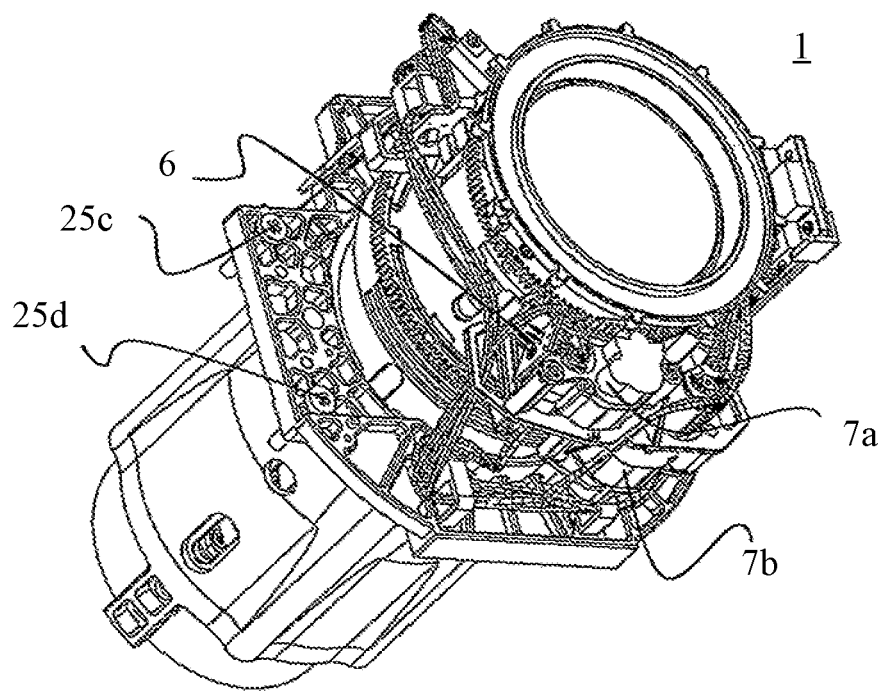
FIG. 3 is a perspective view of the projection lens according to each embodiment.
Figure 4:
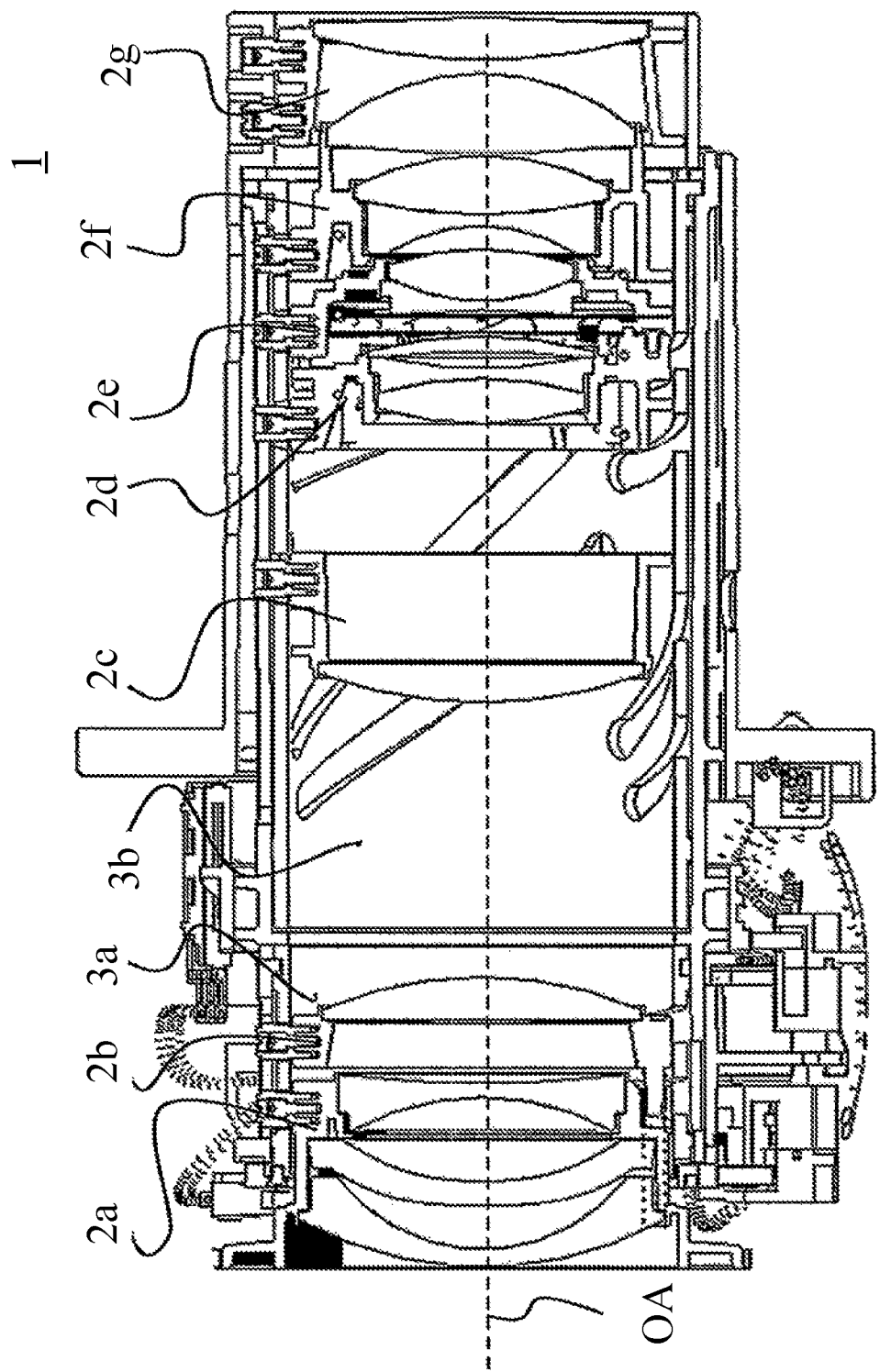
FIG. 4 is a perspective view of the projection lens according to each embodiment.

Referring now to FIGS. 2 to 4, a description will be given of a structure of the projection lens 1 according to this embodiment. FIGS. 2 and 3 are perspective views of the projection lens 1. FIG. 4 is a sectional view of the projection lens 1.

The projection lens 1 includes a plurality of barrels 2a to 2g each holding a plurality of lenses. The barrels 2a and 2b move along an optical axis OA (in an optical axis direction) for focusing. The barrels 2a and 2b can move when a focus cam 3a rotates via a focus gear 4a. A focus motor 7a provides a rotating force to the focus gear 4a. A photo-interrupter 6 detects a rotating position of the focus cam 3a. In this embodiment, the photo-interrupter 6 has a reference position where part of the focus gear 4a contacts an end detection switch 5, and detects a motor rotation amount from the reference position.

The barrels 2c, 2d, 2e, and 2f move in the optical axis direction for zooming. The barrels 2c, 2d, 2e, and 2f can move as the zoom cam 3b is rotated via the zoom gear 4b. The zoom motor 7b provides a rotating force to the zoom gear 4b. A linear encoder 8 moves in association with part of the zoom gear 4b, and detects a rotating position of the zoom cam 3b. The barrel 2g is a fixed barrel that does not move in the optical axis direction. In this embodiment, the barrels 2c to 2f, the zoom cam 3b, the zoom gear 4b, and the zoom motor 7b constitute a zoom mechanism (image adjuster) configured to adjust a projected image.

The focus cam 3a and the zoom cam 3b are covered with a fixed cylinder 10. The fixed cylinder 10 is covered with a mount 11. The projection lens 1 includes the lens control board 9 that has the lens microcomputer 9a and the memory 9b. The lens control board 9 is electrically connected to the control substrate 24 in the projection display apparatus 12, and drives a lens, such as a zoom (or zooming) lens. The projection lens 1 is fixed onto the projection display apparatus 12 through screws 25a, 25b, 25c, and 25d, and mechanically attached to and detached from the projection display apparatus 12.

A description will now be given of a setting method of a zoom driving condition according to each embodiment.

First Embodiment

Figure 1:
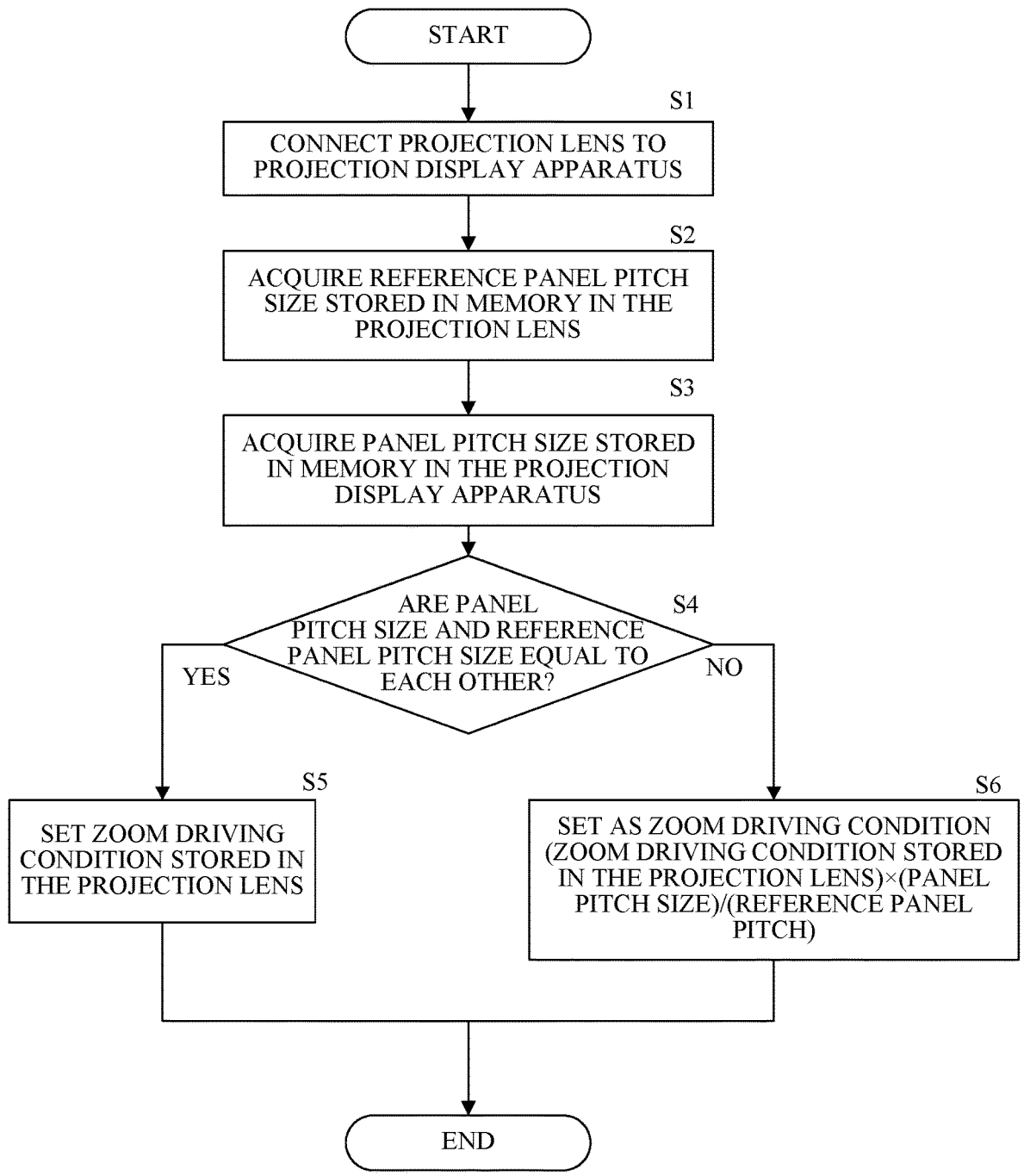
FIG. 1 is a flowchart of a setting method of a zoom driving condition according to a first embodiment.

Referring now to FIG. 1, a description will be given of a setting method of a zoom driving condition according to a first embodiment of the present invention. FIG. 1 is a flowchart of the setting method of the zoom driving condition according to this embodiment. Each step in FIG. 1 is executed by the control substrate (controller) 24 in the projection display apparatus 12. At least part of steps in FIG. 1 may be executed by the lens control board (lens controller) 9 in the projection lens 1.

This embodiment previously determines a panel pitch size (reference panel pitch size) for each of the liquid crystal panels 20R, 20G, and 20B as a driving (zooming) basis for the projection lens 1, and stores the zoom driving condition corresponding to the reference panel pitch size in the memory 9b. For example, assume that the reference panel pitch size is 0.008 mm. For zooming in which half the reference panel pitch size as 0.004 mm is set to the unit driving amount (minimum adjustment amount or fine (micro) adjustment driving amount), the driving voltage and the driving time for the projection lens 1 are stored as the zoom driving condition in the memory 9b. When the projection lens 1 is attached to the projection display apparatus 12 that includes a liquid crystal panel with the same panel pitch size as the reference panel pitch size in the projection lens 1, the 0.004 mm as the unit driving amount provides a zooming amount with a unit of 0.5 pixels.

This embodiment previously stores the panel pitch size for each of the liquid crystal panels 20R, 20G, and 20B mounted in the projection display apparatus 12 in the memory 24b in the control substrate 24. For example, each of the panel pitch sizes in the liquid crystal panels 20R, 20G, and 20B is 0.004 mm according to this embodiment.

Initially, in the step S1, the projection lens 1 is connected to the projection display apparatus 12. At this time, the lens control board 9 in the projection lens 1 and the control substrate 24 in the projection display apparatus 12 are electrically connected to each other. Next, in the step S2, the control substrate 24 (microcomputer 24a) acquires information on the reference panel pitch size (0.008 mm in this embodiment) stored in the lens control board 9 (memory 9b). Next, in the step S3, the microcomputer 24a acquires from the memory 24b the information on the panel pitch sizes for the liquid crystal panels 20R, 20G, and 20B (0.004 mm in this embodiment) stored in the memory 24b.

Next, in the step S4, the microcomputer 24a determines whether the reference panel pitch size (0.008 mm) in the projection lens 1 stored in the memory 9b and the panel pitch size in the projection display apparatus 12 stored in the memory 24b are equal to each other. Where the reference panel pitch size in the projection lens 1 and the panel pitch size in the projection display apparatus 12 are equal to each other, the flow moves to the step S5. In the step S5, the microcomputer 24a sets the zoom driving condition (driving voltage and driving time) stored in the microcomputer 9b in the projection lens 1, to the zoom driving condition for zooming.

Where the reference panel pitch size in the projection lens 1 and the panel pitch size in the projection display apparatus 12 are not equal to each other, the flow moves to the step S6.

For example, where the reference panel pitch size in the projection lens 1 is 0.008 mm and the panel pitch size in the projection display apparatus 12 is 0.004 mm, it is determined that they are not equal to each other. In the step S6, the microcomputer 24a determines the zooming driving condition based on the zoom driving condition (reference driving condition) stored in the microcomputer 9b in the projection lens 1, the panel pitch size in the projection display apparatus 12, and the reference panel pitch size in the projection lens 1. More specifically, the microcomputer 24a sets as the zoom driving condition a value of the zoom driving condition stored in the microcomputer 9b multiplied by 0.5 that is a value obtained by dividing the panel pitch size stored in the memory 24b by the reference panel pitch size stored in the memory 9b.

Hence, in this embodiment, the controller (microcomputer 24a) in the projection display apparatus 12 sets the driving condition for the lens apparatus (projection lens 1) in accordance with a size of one pixel in the image generator (liquid crystal panels 20R, 20G, and 20B). The controller may change the unit driving amount (minimum adjustment amount or the fine adjustment driving amount) of the image adjuster (zoom mechanism) in the lens apparatus as the driving condition. The controller may change, as the driving condition, the driving voltage or the driving time of the image adjuster in the lens apparatus. The driving condition is a zooming condition for the image adjuster. The controller may set the driving condition based on the reference pitch size stored in the lens apparatus attached to the projection display apparatus 12, the reference driving condition corresponding to the reference panel pitch size, and the panel pitch size of the liquid crystal panel. The controller may set to the driving condition a value of the panel pitch size multiplied by the reference driving condition and divided by the reference panel pitch size.

Where this embodiment is not applied, fine adjustment driving is available only with a unit of one pixel, whereas this embodiment can provide fine adjustment with a unit of 0.5 pixels. Hence, this embodiment can provide a projection display apparatus and a lens apparatus, which can provide a proper fine adjustment when a panel pitch size in the projection display apparatus is different from a reference panel pitch size stored in the lens apparatus.

Second Embodiment

Figure 6:
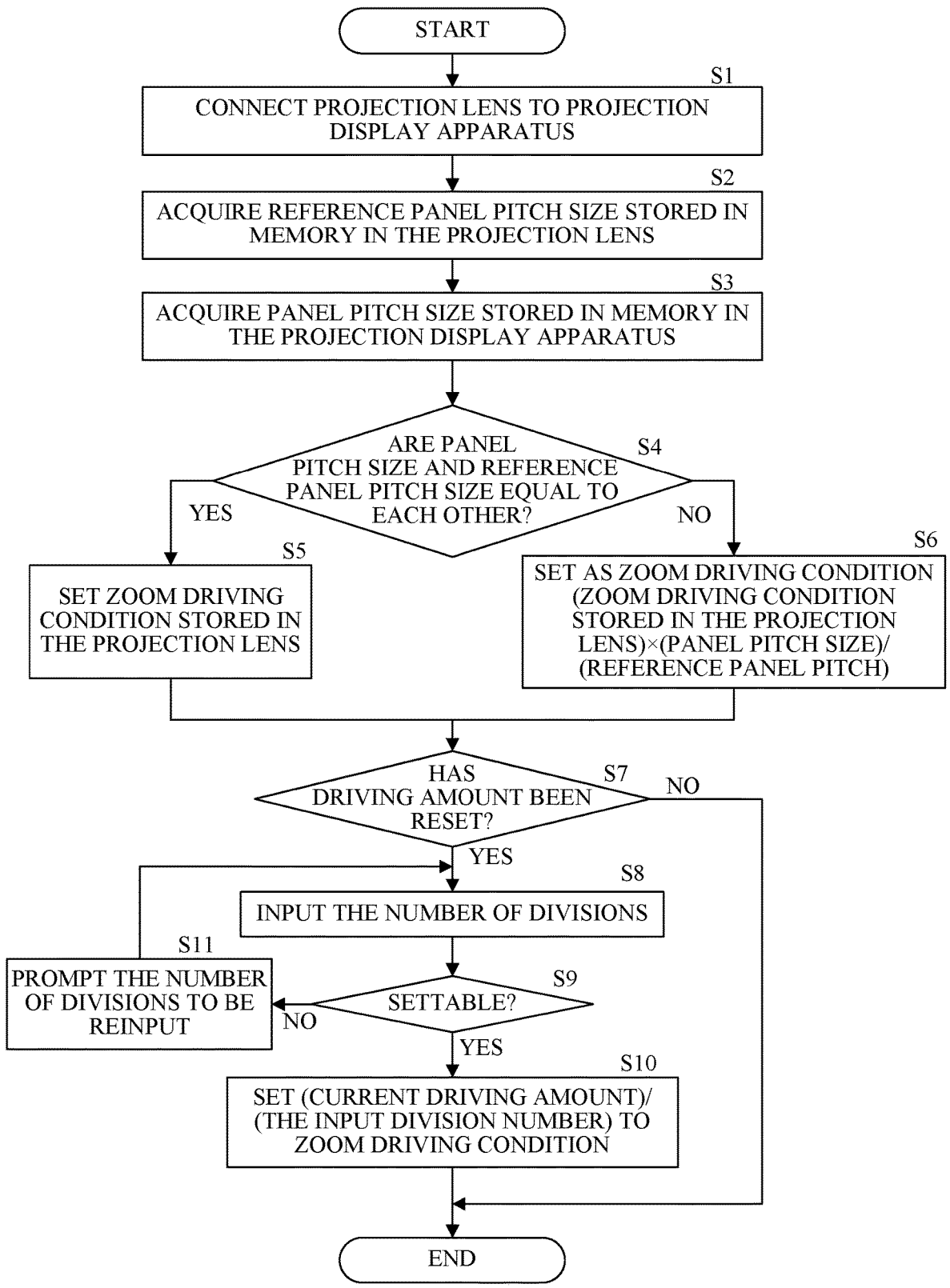
FIG. 6 is a flowchart of a setting method of a zoom driving condition according to a second embodiment.

Referring now to FIG. 6, a description will be given of a setting method of a zoom driving condition according to a second embodiment of the present invention. FIG. 6 is a flowchart of the setting method of the zoom driving condition according to this embodiment. Each step in FIG. 6 is executed by the control substrate (controller) 24 in the projection display apparatus 12. At least part of the steps in FIG. 6 may be executed by the lens control board (lens controller) 9 in the projection lens 1. The setting method of the zoom driving condition according to this embodiment is different from that of the first embodiment in that FIG. 6 further includes the steps S7 to S10. Other steps are common to those in FIG. 1, and thus a description thereof will be omitted.

As illustrated in FIG. 6, the flow in this embodiment moves to the step S7 after the step S5 or S6. In the step S7, the microcomputer 24a determines whether a finer adjustment driving amount is to be set. More specifically, the microcomputer 24a selects a fine adjustment driving setting mode when the finer adjustment driving amount is to be set after the image adjuster (or a user of the projection display apparatus 12) fine-adjusts the image. When the fine adjustment driving amount setting mode is not selected, the microcomputer 24a ends this flow without changing the zoom driving condition set in the step S5 or S6.

On the other hand, when the fine adjustment driving amount setting mode is selected, the flow moves to the step S8. In the step S8, the user inputs the number of divisions for the current fine adjustment driving amount (or how many parts the current fine adjustment driving amount is to be divided into). For example, when the current fine adjustment driving amount is to be divided into two parts, "2" is set to the number of divisions. Designating an excessively large division number may not realize the divided fine adjustment driving amount due to the hardware problem. Hence, in the following step S9, the microcomputer 24a determines whether the input number of divisions is viable. For example, the microcomputer 24a determines whether the input number of divisions is smaller than a predetermined division number (threshold).

In the step S9, when the microcomputer 24a determines that the input number of divisions is viable, the microcomputer 24a resets the current fine adjustment driving amount divided by the set number of divisions to the fine adjustment driving amount. The microcomputer 24a resets the zoom driving condition (driving voltage and driving time) corresponding to the reset fine adjustment driving amount. The microcomputer 24a sets 0.25 pixels to the zoom driving condition, for example, which is made by dividing 0.5 pixels as the current fine adjustment driving amount by the input number of divisions of "2." In other words, the microcomputer 24a sets a value made by dividing the zoom driving condition set in the step S6 by 2. In the step S9, where it is determined that the input division number is not viable, for example, where the division number of "100" is input, the microcomputer 24a prompts the user to set the division number smaller than the input division number (or equal to or smaller the upper limit division number) through a display etc., and returns to the step S8.

Thus, the controller in this embodiment sets the division number relating to the size of one pixel in the image generator in accordance with the input of the user, and resets the driving condition (zoom driving condition) based on the division number. This embodiment can provide a finer adjustment with a unit of 0.5 pixels or smaller. This embodiment can provide a projection display apparatus and a lens apparatus, which can provide a proper fine adjustment when a panel pitch size in the projection display apparatus is different from a reference panel pitch size stored in the lens apparatus.

Each embodiment sets the fine adjustment driving amount with a previously set value, but may calculate the panel pitch size in the projection display apparatus and set the fine adjustment driving amount in accordance with the calculated panel pitch size.

While each embodiment sets the zoom driving amount for zooming to the fine adjustment driving amount, but may set the focus driving amount for focusing to the fine adjustment driving amount. For example, where the focus fine adjustment is continuously driven in the same direction, the focus fine adjustments, for example, ten times may be set from when the focus state becomes in focus to when the focus state becomes out of focus. Where the panel pitch size in the projection display apparatus is different, the depth of field in the projection lens fluctuates. Hence, if the panel pitch size is not considered in calculating the fine adjustment driving amount and a projection lens is attached to the projection display apparatus having a different panel pitch size, a movement in the depth of field is not compatible with setting the fine adjustments ten times. Each embodiment can provide a proper fine adjustment for focusing.

The depth of field fluctuates in accordance with the F-number in the projection lens. Therefore, in calculating the fine adjustment driving amount for focusing, the F-number may be considered. The F-number depends on position information, such as the zoom position and the aperture degree in the diaphragm (stop) mechanism in the projection lens. Therefore, even when the F-number is not directly used, the position information may be considered in the calculation.

While each embodiment uses a liquid crystal panel for the image generator, the present invention is not limited to the embodiments and another image generator, such as a DMD instead of the liquid crystal panel may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-106589, filed on May 30, 2017, which is hereby incorporated by reference herein in its entirety.

What is claimed is:

1. A projection display apparatus to which a lens apparatus including a storage configured to store information about a reference panel pitch is detachably attachable, the projection display apparatus comprising:
   a panel configured to generate an image; and
   a controller configured to set a driving condition for the lens apparatus in accordance with information about a panel pitch of the panel and the information about the reference panel pitch,
   wherein the controller sets a unit driving amount in an adjuster in the lens apparatus for the driving condition.

2. The projection display apparatus according to claim 1, wherein the controller sets a driving voltage and a driving time of the adjuster in the lens apparatus for the driving condition.

3. The projection display apparatus according to claim 1, wherein the driving condition is a zoom driving condition of the adjuster.

4. The projection display apparatus according to claim 1, wherein the panel includes a liquid crystal panel, and
   wherein the controller sets the driving condition based on the reference panel pitch stored in the lens apparatus attached to the projection display apparatus, a reference driving condition corresponding to the reference panel pitch, and a panel pitch in the liquid crystal panel.

5. The projection display apparatus according to claim 4, wherein the controller sets to the driving condition a value of the panel pitch multiplied by the reference driving condition and divided by the reference panel pitch.

6. The projection display apparatus according to claim 5, wherein the controller sets to the driving condition the reference driving condition corresponding to the reference panel pitch when the reference panel pitch is equal to the panel pitch, and
   wherein the controller sets to the driving condition the driving condition a value of the panel pitch multiplied by the reference driving condition and divided by the reference panel pitch when the reference panel pitch is not equal to the panel pitch.

7. The projection display apparatus according to claim 1, wherein the controller sets the number of divisions about the size of the one pixel in the panel in accordance with an input of a user, and resets the driving condition based on the number of divisions.

8. The projection display apparatus according to claim 1, further comprising a storage configured to store information on the size of the one pixel in the panel,
   wherein the controller acquires the information on the size of the one pixel in the panel from the storage.

9. A lens apparatus detachably attachable to a projection display apparatus that includes a, the lens apparatus comprising:
   a lens;
   a lens controller configured to drive the lens; and
   a storage configured to store information about reference panel pitch,
   wherein a driving condition for the lens apparatus is set in accordance with information about a panel pitch of the panel and the information about the reference panel pitch, and
   wherein a unit driving amount in an adjuster in the lens apparatus is set for the driving condition.

10. The lens apparatus according to 9, wherein the lens controller sets a driving condition for the lens in accordance with a panel pitch in the panel.

11. The lens apparatus according to claim 10, wherein the lens controller sets the driving condition based on the reference panel pitch, a reference driving condition corresponding to the reference panel pitch, and a panel pitch in the panel.

12. The lens apparatus according to claim 9, wherein the panel is a liquid crystal panel.

13. A projection display apparatus to which a lens apparatus including a storage configured to store information about a reference panel pitch and a reference driving condition corresponding to the reference panel pitch is detachably attachable, the projection display apparatus comprising:
   a panel configured to generate an image; and
   a controller configured to set a driving condition for the lens apparatus in accordance with information about a panel pitch of the panel, the information about the reference panel pitch and the reference driving condition,
   wherein the controller sets a unit driving amount in an adjuster in the lens apparatus for the driving condition.

14. A lens apparatus detachably attachable to a projection display apparatus that includes a panel, the lens apparatus comprising:
   a lens;
   a lens controller configured to drive the lens; and
   a storage configured to store information about a reference panel pitch and a reference driving condition corresponding to the reference panel pitch,
   wherein a driving condition for the lens apparatus is set in accordance with information about a panel pitch of the panel, the information about the reference panel pitch and the reference driving condition, and
   wherein a unit driving amount in an adjuster in the lens apparatus is set for the driving condition.

* * * * *